United States Patent [19]

Wohlsen

[11] 4,325,786
[45] Apr. 20, 1982

[54] SPACER GRID FOR REDUCING BOWING IN A NUCLEAR FUEL ASSEMBLY

[75] Inventor: William D. Wohlsen, East Granby, Conn.

[73] Assignee: Combustion Engineering, Inc., Windsor, Conn.

[21] Appl. No.: 98,463

[22] Filed: Nov. 29, 1979

[51] Int. Cl.³ .............................................. G21C 3/30
[52] U.S. Cl. .................................... 376/442; 376/462
[58] Field of Search .................................. 176/76, 78

[56] References Cited

U.S. PATENT DOCUMENTS 3,753,855  8/1973  Donck ..................................... 176/78
4,059,483  11/1977 Anthony ................................. 176/78
4,155,807  5/1979  Schreiber .............................. 176/78

Primary Examiner—Donald P. Walsh
Attorney, Agent, or Firm—L. James Ristas

[57] ABSTRACT

A bi-metallic spacer grid having a Zircaloy perimeter strip consisting of oppositely facing, thin walled metal plates for closely surrounding the array of fuel rods. A rigid, stainless steel cross member extends between internal surfaces of the oppositely facing perimeter plates. In the preferred embodiment, the perimeter plates have cantilevered portions extending above and below the main body of the perimeter strip. The cross members interact with the enlarged portion by urging them outward relative to the perimeter strip as the fuel assembly heats up during operation. The outwardly projecting interface surfaces of each assembly mechanically interact with the interface surfaces of adjacent assemblies providing a mechanical restraint which limits bowing of the assembly. The effectiveness of the spacer grids in limiting bowing is therefore not dependent upon controlling the mechanisms responsible for causing bow.

When the reactor is in a cold condition such as during refueling, the exterior dimensions of the spacer grids are the same as those of the other Zircaloy grids, which assures adequate clearance for insertion and withdrawal of individual fuel assemblies.

8 Claims, 5 Drawing Figures

SPACER GRID FOR REDUCING BOWING IN A NUCLEAR FUEL ASSEMBLY

BACKGROUND OF THE INVENTION

This invention relates to nuclear reactor fuel assemblies, and in particular to structure carried by the assemblies for reducing the magnitude of the lateral deformation, or bowing, of the assembly which may occur during reactor operation.

Each of approximately 200 fuel assemblies in a modern pressurized water reactor (PWR) typically consists of a square array of fuel rods having external dimensions on the order of 8×8×160 inches (20×20×410 centimeters). In order to maximize neutron economy, it is highly desirable to make all structural components of the assembly from Zircaloy. In contrast, the reactor vessel internal structures, which support the fuel assemblies, are typically made from type 304 stainless steel.

During reactor operation, forces acting on the fuel assemblies tend to cause small lateral distortions of the fuel assembly structures. The only upper limit on the total magnitude of such distortions is the summation of the lateral clearances between the fuel assemblies. Assemblies having all Zircaloy structures are more susceptible to such deformation than those having stainless or Inconel structures because Zircaloy has a lower elastic modulus and tends to creep under irradiated conditions at a greater rate than stainless steel or Inconel, thereby assuming a slightly bowed shape in less time than the duration of a typical reactor cycle. Such distortions are undesirable because they may complicate refueling and they may introduce slight variations in local power density by virtue of the uneven water gap between assemblies.

The magnitude of the nominal lateral clearance between adjacent fuel assemblies is determined by the outside dimensions of the fuel assembly grids. Compared with stainless steel or Inconel grids, Zircaloy grids have two distinct differences with respect to fuel assembly bowing. First, the initial clearance for the Zircaloy grid must include an allowance for irradiation induced lateral growth. Otherwise, clearances between irradiated assemblies will become so small that withdrawing and inserting individual assemblies during refueling may become difficult. Second, differential expansion between the stainless steel vessel internals structure and the Zircaloy grids causes the clearance at operating temperatures to increase substantially (up to 50 percent), thereby allowing space for larger bowing during operation.

It has been proposed to reduce the bowing by using one or more stainless steel or Inconel grids near the midplane of the assemblies. Although such a grid would limit bowing, it is not a desirable solution for two reasons. First, the replacement of even a single Zircaloy grid with one of stainless steel would increase parasitic neutron absorption. Second, the greater lateral stiffness of stainless steel grids relative to Zircaloy, coupled with the lower lateral clearance of the stainless grids, would cause impact loads associated with seismic disturbances or accident conditions such as loss of coolant, to be concentrated on the stainless grid, thereby necessitating an extremely strong grid.

SUMMARY OF THE INVENTION

The present invention significantly reduces the amount of fuel assembly bow which could occur with assemblies having Zircaloy structure. It achieves this benefit by introducing a very small amount of stainless steel lateral support structure in each fuel assembly in the form of a bi-metallic spacer grid which is located near the core midplane. The essence of the invention is that mass and structural properties of the stainless steel portion, although sufficient to prevent bowing from normal operating forces, do not have significant adverse effects on either neutron economy or seismic analysis.

The spacer grid has a perimeter strip consisting of oppositely facing, thin walled metal plates for closely surrounding the array of fuel rods. A rigid, stainless steel cross member extends between internal surfaces of the oppositely facing perimeter plates. In the preferred embodiment, the perimeter plates have cantilevered portions extending above and below the main body of the perimeter strip. The cross members interact with the enlarged portion by urging them outward relative to the perimeter strip as the fuel assembly heats up during operation. The outwardly projecting interface surfaces of each assembly mechanically interact with the interface surfaces of adjacent assemblies providing a mechanical restraint which limits bowing of the assembly. The effectiveness of the spacer grids in limiting bowing is therefore not dependent upon controlling the mechanisms responsible for causing bow.

When the reactor is in a cold condition such as during refueling, the exterior dimensions of the spacer grids are the same as those of the other Zircaloy grids, which assures adequate clearance for insertion and withdrawal of individual fuel assemblies.

Since the stainless steel cross member contains far less structure than a grid made entirely of stainless, the stainless steel portion of the inventive spacer grid does not have sufficient lateral stiffness to absorb significant impact loads before the Zircaloy portion of the grid comes into contact. Thus, the properties of the Zircaloy grids still predominate in the seismic response. Furthermore, a spacer grid constructed in accordance with the preferred embodiment of the invention parasitically absorbs only about thirty percent of the neutrons that a stainless steel grid would absorb.

BRIEF DESCRIPTION OF THE DRAWINGS

These and other objects and advantages of the invention will be more fully appreciated from the following detailed description and drawings in which:

FIG. 2b is an elevation view of the prior art fuel assembly shown in FIG. 2a;

DESCRIPTION OF THE PREFERRED EMBODIMENT

Figure 1:
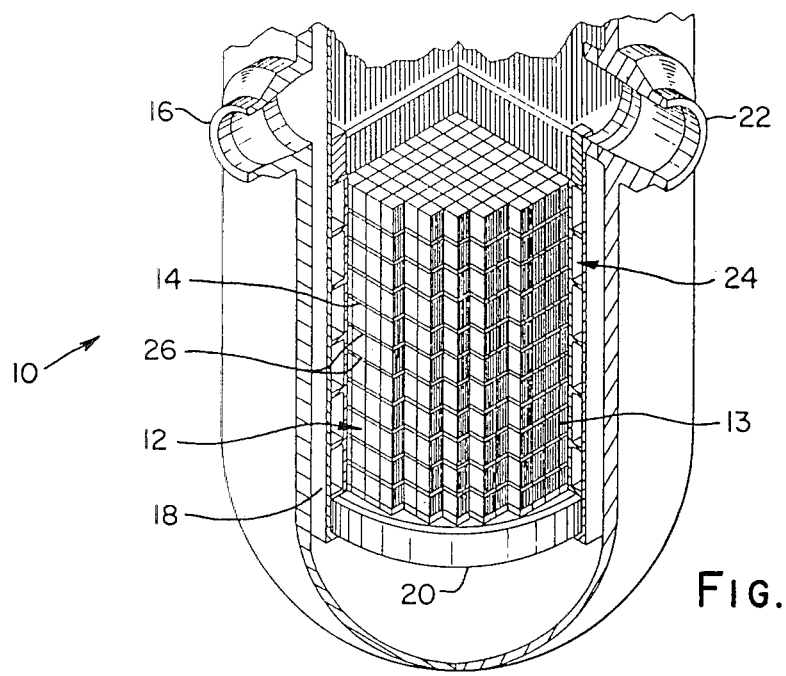
FIG. 1 is a cutaway view of a nuclear reactor showing a plurality of fuel assemblies defining the reactor core.

FIG. 1 generally shows the portion of a nuclear reactor 10 which contains the reactor core defined by a multiplicity of closely spaced nuclear fuel assemblies 12.

Each fuel assembly 12 has an array of nuclear fuel rods 13 which are typically supported by a plurality of axially separated grids 14. The fuel assemblies have means (not shown) for engaging the lower support structure 20, which helps maintain the spacing between assemblies 12. The core is bounded by a core shroud 24, which restrains the core in the event of a severe seismic or other disturbance. During power operation, liquid water at about 565° F. (299° C.) and 2250 psi enters the reactor 10 through inlet nozzle 16, passes down the inlet plenum 18, rises up through the lower support structure 20, passes over the fuel rods 13 where the generated power raises the water temperature by about 60° F., and exits the reactor through outlet nozzle 22.

The lower support structure 20, core shroud 24, and other vessel internal structures (not shown) which provide spacing and support for the core, are typically made of type 304 stainless steel. The fuel assemblies 12, however, are made to the greatest extent possible, of a low neutron absorption material such as Zircaloy. As was described above, the coefficients of thermal expansion of stainless steel and Zircaloy are sufficiently different to affect the spacing between fuel assemblies 12 as a consequence of whether the reactor is in the shutdown condition (approximately 150° F.) or the operating condition (approximately 600° F.).

Due to lateral flow forces associated with core flow redistribution between the core inlet and outlet, the fuel assemblies 12 have a tendency to become slightly bowed after the reactor has been operating at power for several months. The bowing can be thought of as a bending of the assembly whereby the central region of the assembly is displaced laterally relative to the initial assembly centerline. It can be appreciated that as bowing continues the central portion of the assemblies closest to the core shroud 24 will abut the shroud, and the next row of assemblies will abut the first row and, in a similar fashion the entire core could be bowed such that the spacings between assemblies deviate significantly from the nominal uniform dimensions. Furthermore, the bowing tends to be permanent so that the potential danger exists that, even after the reactor is cooled, it may be difficult to remove individual assemblies for refueling purposes.

Figure 2A:
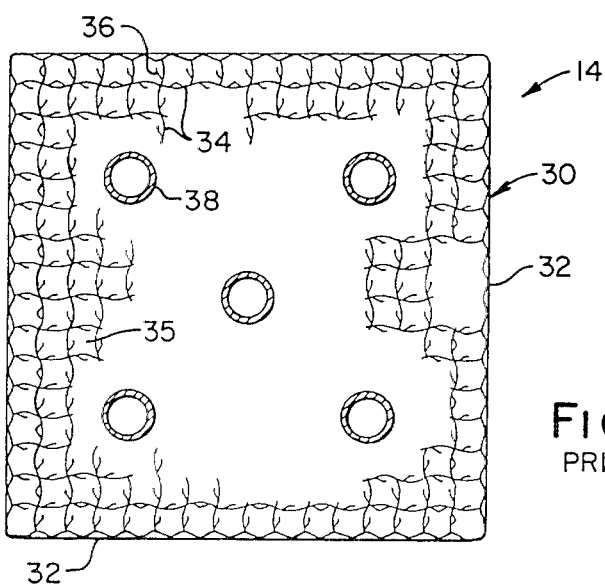
FIG. 2a is a plan view of a typical prior art fuel assembly.

FIG. 2a shows a plan view of a typical fuel assembly grid 14, with the fuel rods removed for clarity. The grid 14 has a square perimeter strip 30 comprising four oppositely facing perimeter plates 32. Within the perimeter strip 30 is a lattice of perpendicular straps 34 which define openings 35 through which the fuel rods traverse the grids. Springs 36 extend into the openings to provide spacing and support between individual fuel rods. In the illustrated embodiment, each fuel assembly has a plurality of guide tubes 38 to which the grids 14 are attached, and which provide passage for control rods (not shown) which may be telescopically moved therein.

Figure 2B:
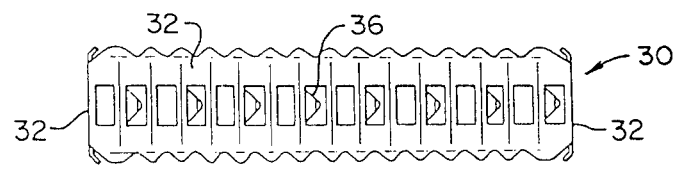

FIG. 2b is an elevation view of the grid 14 showing the perimeter plates 32 which together form the perimeter strip 30. Each perimeter plate 32 may itself have springs 36 formed thereon and projecting inwardly to support the fuel rods. The perimeter strip 30 circumscribes the array of fuel rods and defines the transverse outer dimensions of the fuel assembly 12.

Figure 3:
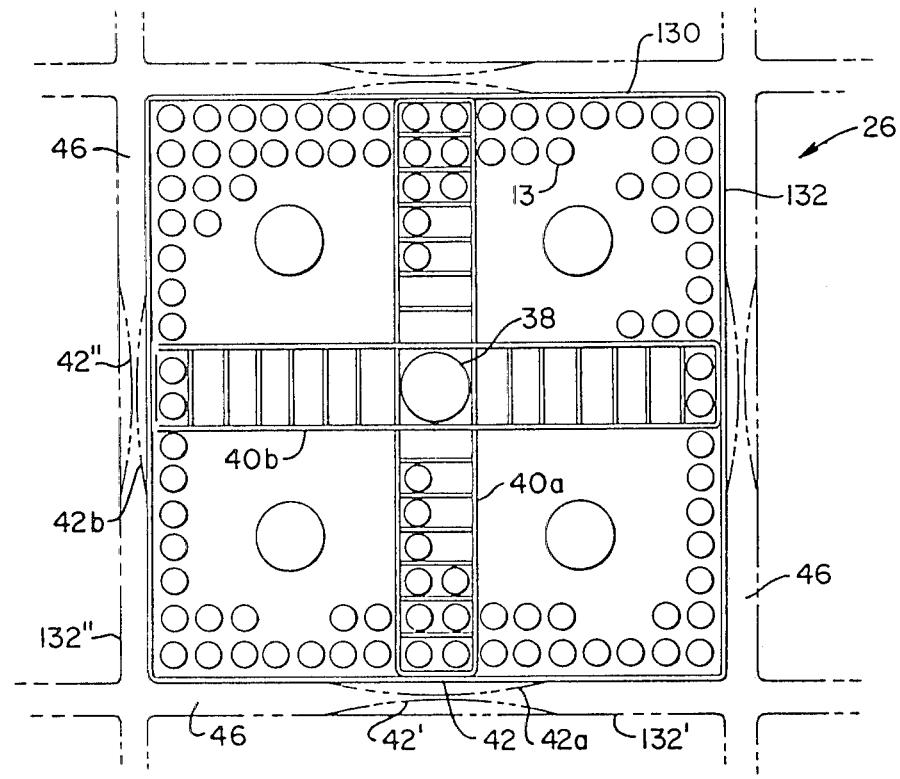
FIG. 3 is a plan view of the preferred embodiment of the invention showing stainless steel cross members extending between oppositely facing perimeter plates, where the interlacing grid straps and fuel rods are omitted for clarity.

Referring again to FIG. 1, the present invention proposes modifying one or more of the grids 26 located near the midplane of each assembly 12. FIG. 3 is a plan view of a modified bi-metallic, anti-bow grid. The perimeter strip 130 corresponds to conventional perimeter strip 30, and perimeter plates 132 corresponds to perimeter plates 32. (See FIG. 2a) In FIG. 3, the straps 34 have been eliminated for clarity, and a few fuel rods 13 are shown for the purpose of illustrating the relationship of the modified spacer grid 26 to the fuel rods 13. The grid 26 is shown located in the reactor adjacent to similar grids having perimeter plates 132', 132", with a water gap or space 46 between adjacent assemblies.

In the present invention, a pair of perpendicular stainless steel cross members 40a, 40b extend between oppositely facing Zircaloy perimeter plates 132. The cross members 40 are rigid so that the greater thermal expansion of the cross members relative to that of the oppositely facing perimeter plates 132, produces an outward projection of the portion of the perimeter plates which contact the cross member. This is shown, for example, in phantom where the interaction surface 42a projects outwardly in to the gap 46 as the cross member 40a expands during core operation. In a like fashion, the interaction surfaces 42', 42" of adjacent assemblies also project outwardly. The fact that the positions of these interaction surfaces are controlled by stainless steel, rather than Zircaloy, permits the initial interassembly clearance to be set small, without consideration for irradiation induced lateral growth of Zircaloy, and also ensures that there will be no increase in the average interassembly gap during operation due to differential thermal expansion. These effects combine to maintain small gaps between assemblies and thereby do not allow room for significant bowing to occur.

The cross members 40a, 40b shown in FIG. 3 are positioned by the center guide tube 38, and supported by mechanical connections (such as rivets) at the interface surfaces 42a, 42b of the perimeter plate 132. Each cross member 40 should have the minimum possible volume of stainless steel material while still providing sufficient rigidity to urge the contact surfaces 42 outward to resist bowing. The stiffness should not be so great, however, to cause a substantial portion of the seismic load to be borne by the cross members in the event of a seismic disturbance. In the illustrated embodiment, the cross members are ladder-like whereby spaces within the ladder are provided for permitting fuel rods 13 to extend through the cross members 40.

Figure 4:
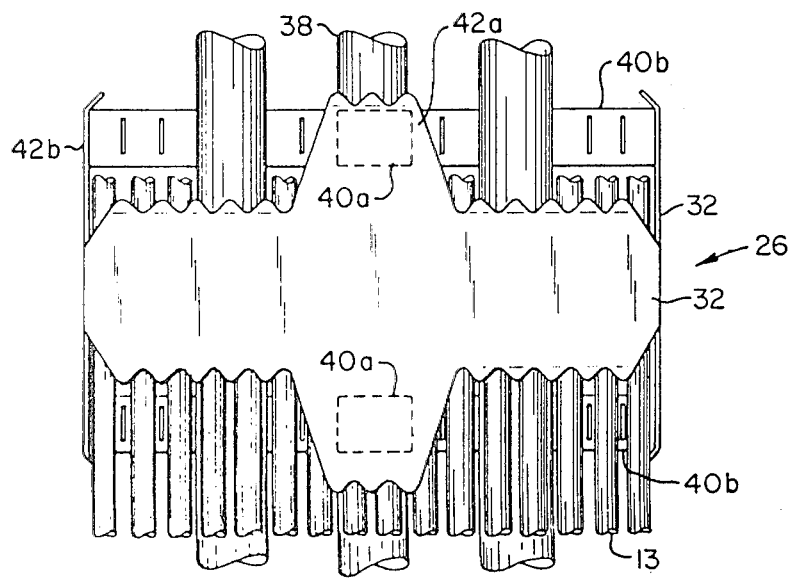
FIG. 4 is an elevation view of the spacer grids shown in FIG. 3.

FIG. 4 shows the preferred embodiment in elevation view where it can be seen that the cross members 40a, 40b are located immediately above and below the portion of the grid 26 containing the straps. Furthermore, the central portions of the perimeter plates 32 are enlarged and cantilevered to provide an interface surface 42a, 42b which can be urged outward by the cross members 40a, 40b, respectively. Thus, each spacer grid 26 has two tiers of cross members 40 carried thereon.

Although the preferred embodiment of the invention has been described, the details of the stainless steel cross member, such as whether or not the cross member includes provision for fuel rod support, are established for a particular fuel assembly design based on considerations of desired lateral stiffness, resistance to flow induced vibration, and predicted magnitude of lateral forces acting on the fuel assemblies. Accordingly, the invention as claimed should be construed to include all embodiments within the spirit of the invention disclosed herein.

What is claimed is:

1. In a nuclear fuel assembly including a plurality of elongated parallelly spaced fuel rods and a plurality of metal grids axially separated along said fuel rods, each grid having a plurality of oppositely facing perimeter plates forming a perimeter strip closely surrounding all said fuel rods and a plurality of interlaced straps extending between said perimeter plates, said straps defining openings through which said fuel rods traverse the grids and carrying means thereon for spacing the fuel rods in the assembly, wherein the improvement comprises:

at least one of said grids being located near the assembly midplane and further including a cross member made of a second material having a higher coefficient of thermal expansion than said straps and interposed between oppositely facing perimeter plates such that when the assembly thermally expands said one grid will be larger in transverse section than the other grids in the assembly.

2. A spacer grid for a nuclear fuel assembly having a rectangular array of elongated fuel rods, comprising:

a perimeter strip having oppositely facing thin-walled plates made of a first material for closely surrounding the array of fuel rods, said strip being generally rectangular in transverse section;

a plurality of interlaced straps each extending between oppositely facing perimeter plates, said straps defining openings for fuel rods to be received and carrying means thereon for spacing the fuel rods; and a rigid cross member extending between external surfaces of the oppositely facing perimeter plates, said member formed of a material having a higher coefficient of thermal expansion than said strips and straps whereby the effective coefficient of expansion of the transverse dimension of the plates is greater than that of the first material.

3. The spacer grid of claim 2 wherein the cross member lies parallel to and axially spaced from said straps.

4. The spacer grid of claim 3 wherein the center portion of each perimeter plate is enlarged in the axial direction to provide an interface surface for interacting with said cross member.

5. The spacer grid of claim 4 wherein each spacer grid has four cross members, a first perpendicular pair spaced above the straps and a second perpendicular pair spaced below the straps.

6. A nuclear reactor core, comprising:

a plurality of closely spaced, parallel fuel assemblies, each assembly containing an array of longitudinally extending fuel rods;

a plurality of spacer grids axially separated on each assembly for supporting the fuel rods therein, each grid having a perimeter strip surrounding said array of fuel rods;

at least some of the spacer grids being located at the same elevation on every assembly and having at least one rigid cross member internally spanning oppositely facing portions of said perimeter strip, the coefficient of thermal expansion of said cross member being greater than the coefficient of the grid;

whereby in the cold condition the maximum transverse dimension of each spacer grid is the same as that of the other grids, but during core operation being transverse dimension of each spacer grid is larger than that of the other grids in the assembly so that the reduced clearance between spacer grids of adjacent assemblies substantially reduces the amount of bowing which could otherwise occur.

7. The core of claim 6 wherein the core is supported by stainless steel structure.

8. The spacer grid of claims 3 or 7 wherein the perimeter strips are Zircaloy and the cross members are steel.

* * * * *